INVENTORS
ROBERT SAVY
LOUIS LEBERT
MAX MARC GUGGENHEIM
BY
George B. Will ATTORNEY

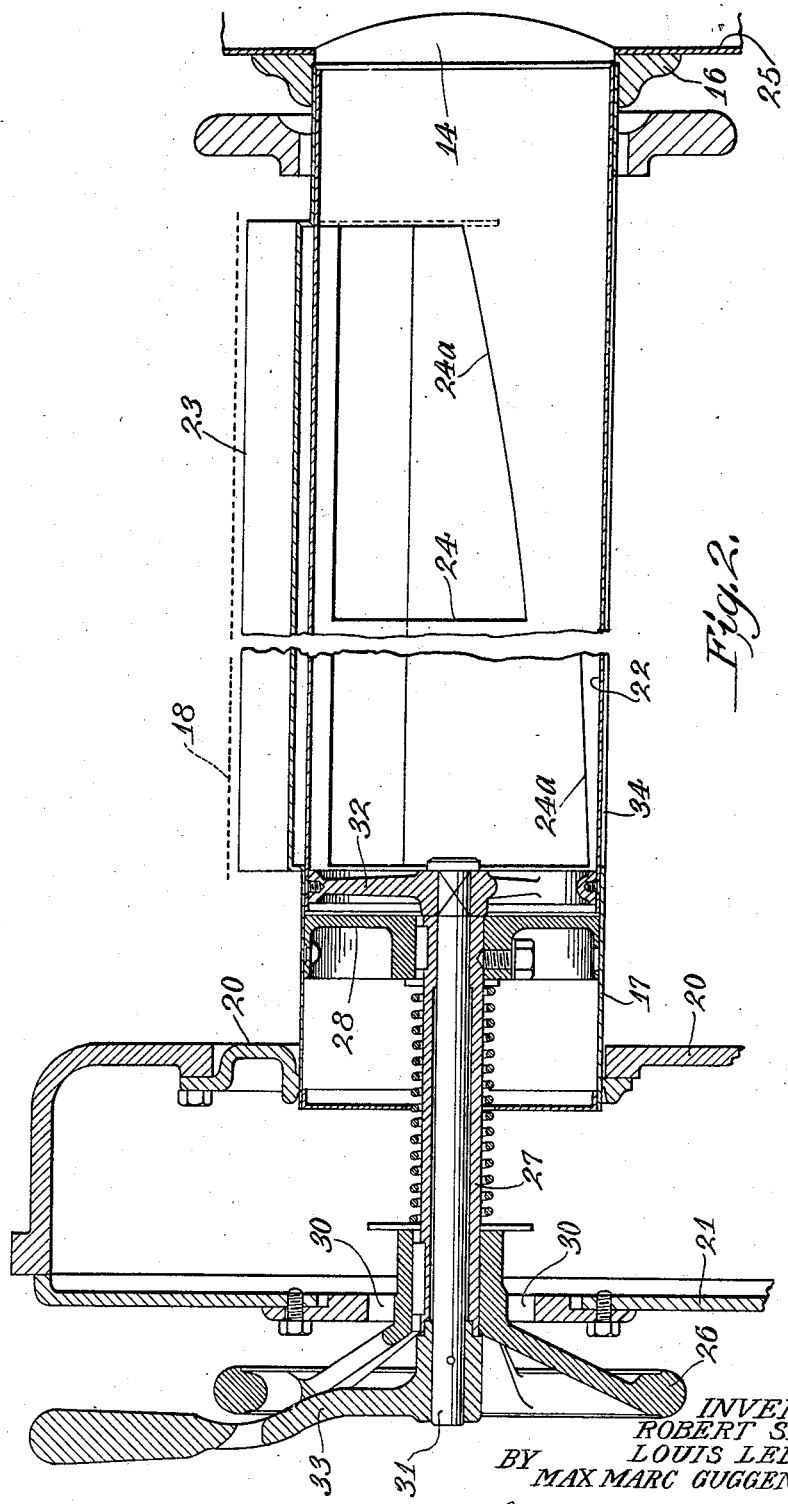

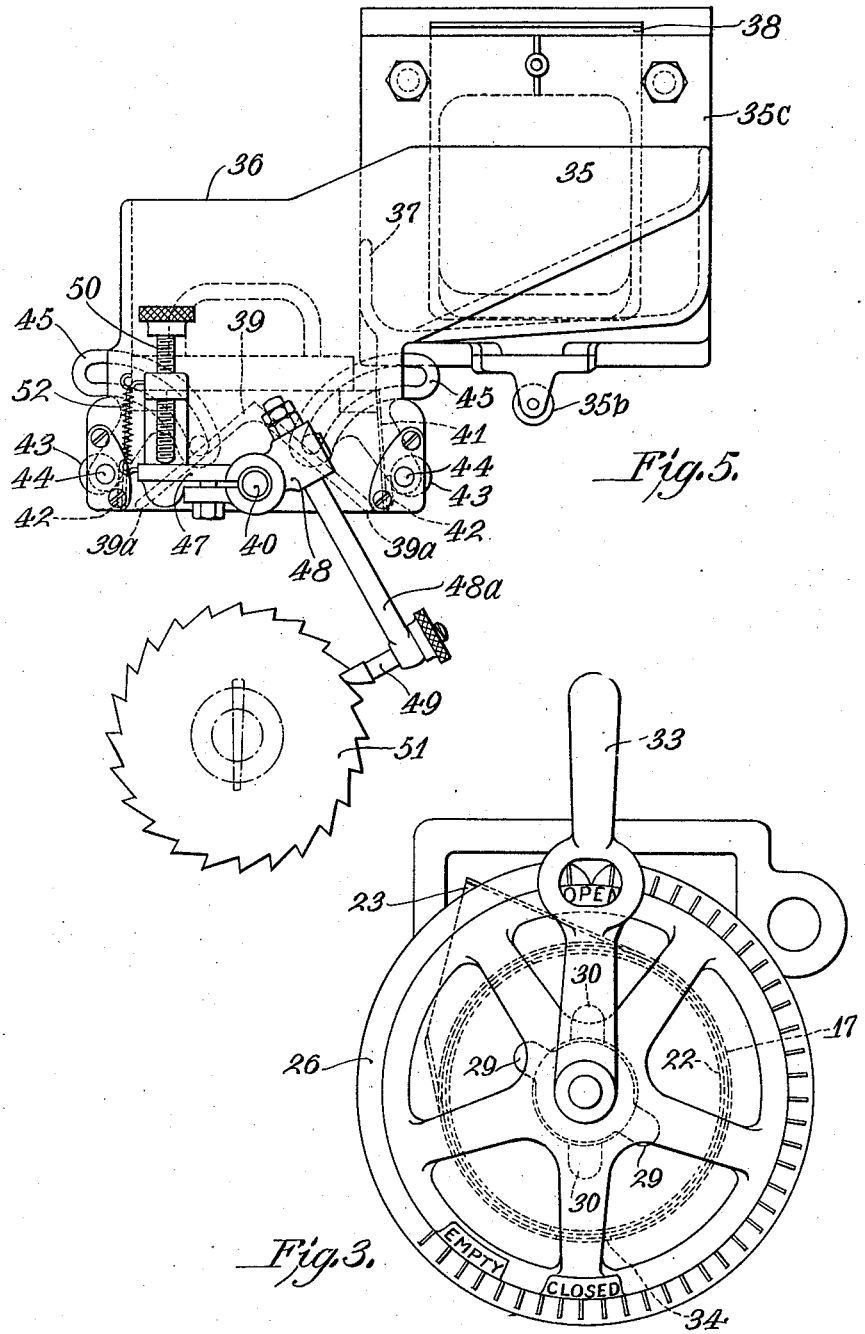

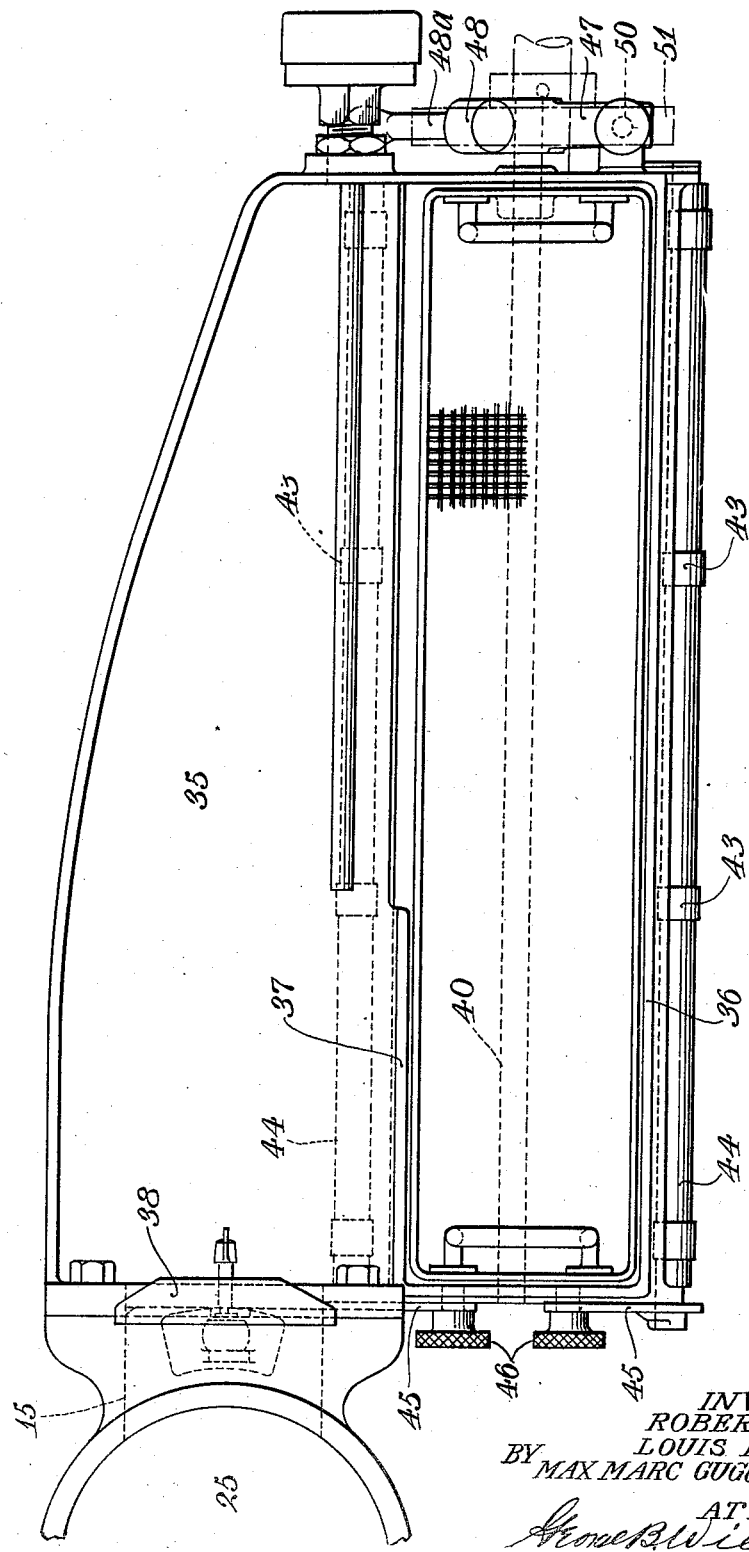

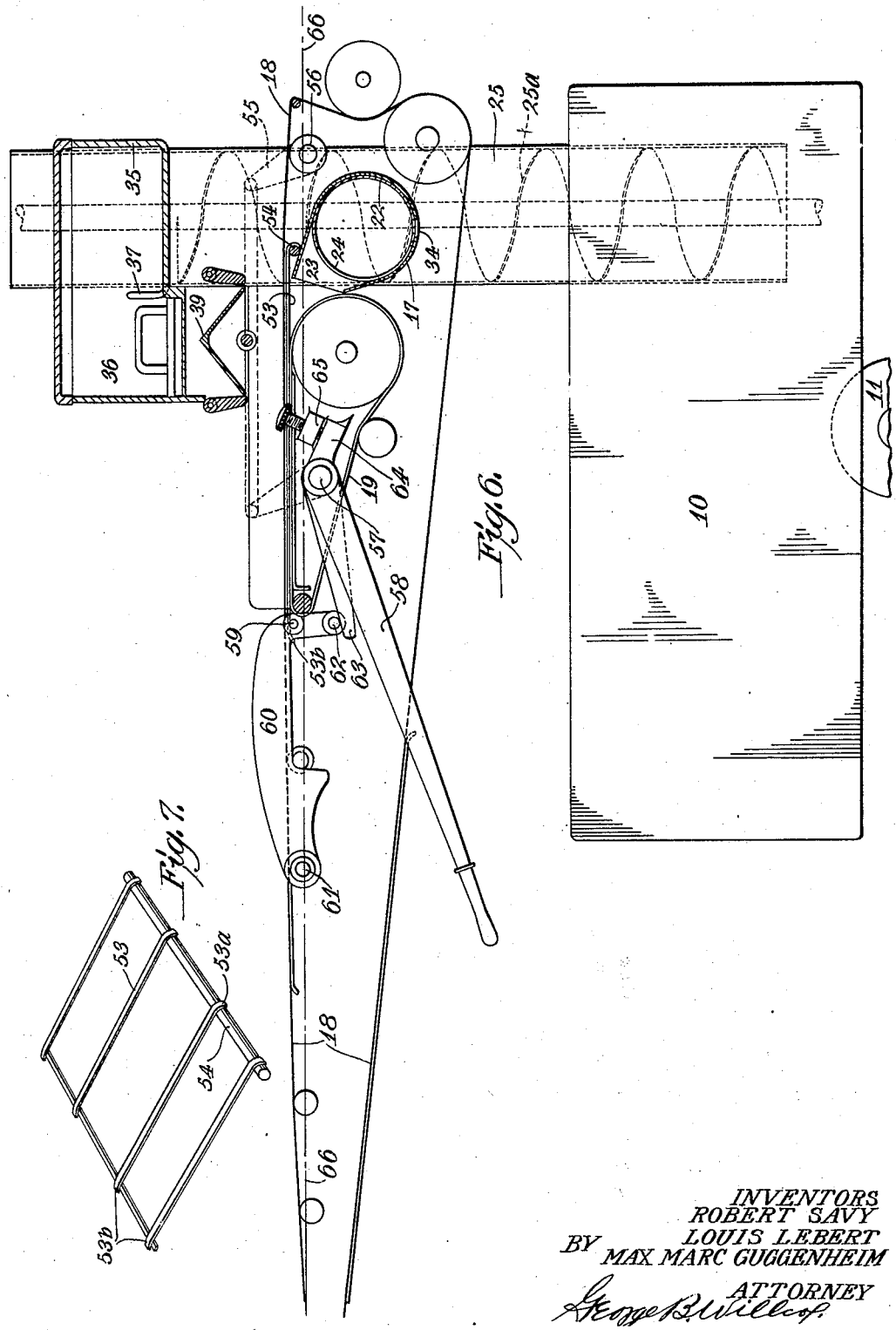

Patented June 16, 1931

1,810,681

UNITED STATES PATENT OFFICE

ROBERT SAVY AND LOUIS LEBERT, OF COURBEVOIE-ON-THE-SEINE, FRANCE, AND MAX MARC GUGGENHEIM, OF SAGINAW, MICHIGAN, ASSIGNORS TO BAKER PERKINS COMPANY, INC., OF SAGINAW, MICHIGAN, A CORPORATION OF NEW YORK

ENROBING OR CONFECTION-COATING APPARATUS

Application filed July 2, 1930, Serial No. 465,284, and in Great Britain May 22, 1929.

This invention relates to machines for enrobing the centers of confections with molten chocolate or other coating material.

The object of this invention is to provide improvements in apparatus of this kind resulting in accessibility for the coating-material-handling portion of the machine for easy and thorough cleaning and a better consistency of coating material as applied to the goods, and mechanical improvements leading to more effective operation of the machine as a whole.

The above named objects and others appearing hereinafter have been accomplished by the following feature of our invention.

One feature of this invention is that the apparatus for handling the coating material, including the drip-catching conditioning tank, the means for raising the chocolate, and the horizontal conduit for producing one or more curtains of falling chocolate across the conveyor of the machine, are assembled in a unit which can be easily removed en bloc from the machine for cleaning and servicing.

Another feature of this invention lies in providing a second conduit leading to the upright chocolate elevating conduit for producing a flow of chocolate over a surface just below the main goods conveyor for coating by immersion only and which serves another purpose when the chocolate for coating and immersion is being supplied by the upper curtain-flow conduit, namely, receiving some or all of the surplus chocolate from the goods and said surface, and passing it into the ascending stream of fresh chocolate in the upper conduit. We have found that this admixture of slightly cooler chocolate with the freshly heated chocolate just before the enrobing operation has a beneficial tempering effect and improves the coating on the finished goods.

Another feature of our invention has to do with the device for producing the curtain of falling chocolate through which the goods to be coated are conveyed, and consists in providing a hopper with an aperture between an edge of a surface thereof and an edge of the bottom, which bottom is mounted so that said edge is movable relatively to said hopper, together with means for vibrating one edge past the other so that the aperture is kept clear for free passage of the chocolate. In connection with this hopper and its oscillatory bottom we have also provided novel means for adjusting the width of the aperture and the thickness of the curtain.

Another novel feature of our invention is the sleeve valve for controlling the outlet of the immersion or "river-flow" conduit, having a port with its lower edge forming a helix so that the end of the said edge nearest the inlet of the conduit is the higher, whereby the drop in pressure along the conduit is compensated and a uniform flow is established.

Another new feature of this invention has to do with the permeable goods-conveyor, of woven wire or other suitable material. We correct the tendency of conveyors of this type to stretch and buckle along the edges by setting the conveyor supports along the working flight in a curved instead of in a flat horizontal plane, so that the conveyor run is highest in the middle and bows downward to the rollers at each end.

The invention also comprises the provision of a frame beneath the conveyor and a mechanism for adjusting it vertically in a constantly horizontal position, so that it supports the conveyor at any desired depth in the immersion-bath of coating material or raises it clear of said bath. A secondary feature is the inter-connection of the frame-raising mechanism and the machine controls so that the conveyor and any goods thereon will automatically be lifted from the coating bath whenever the machine and conveyor stop.

In the accompanying drawings Fig. 1 is an elevation of the chocolate-handling apparatus taken endwise of the enrober, the frame of which is shown in broken lines.

Fig. 2 is a sectional side view of the device for producing the horizontal flow of chocolate for coating goods by immersion.

Fig. 3 is an end view corresponding to Fig. 2.

Fig. 4 is a top plan view of the device which produces the curtain of falling chocolate.

Fig. 5 is an end view corresponding to Fig. 4.

Fig. 6 is a diagrammatic longitudinal section of an enrober showing the cooperative relationship of the chocolate-handling device to the permeable goods conveyor and other associated devices.

Fig. 7 is a perspective view of the frame for raising the permeable conveyor.

Figure 1:
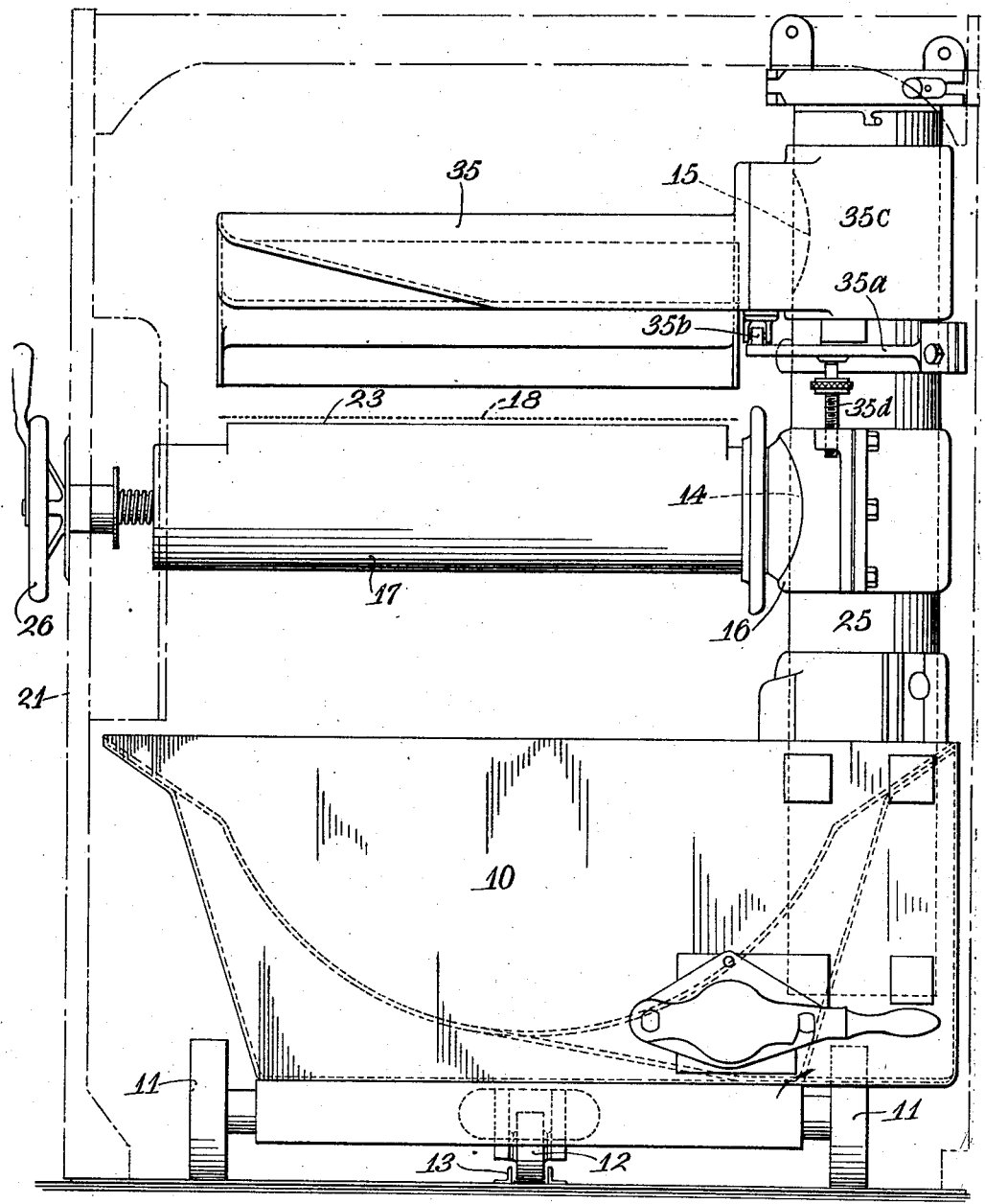

In carrying the invention into effect according to one convenient embodiment, a supply tank 10 (see Fig. 1) for the chocolate is constructed in jacketed form for maintaining the appropriate temperature of the chocolate, and having a top area suitable for catching the surplus chocolate which falls or drains away during the enrobing process. This tank is mounted upon slides or is provided with wheels 11, 12 the latter being adapted to run on rails or guideways 13, so that the tank may be slid into and out of the machine or apparatus, preferably in a longitudinal direction. Upon the tank and preferably within the normal area thereof, an uptake or supply pipe 25 is provided for the chocolate, within which a screw or helical conveyor element 25a is coaxially mounted so that upon the revolution thereof by any suitable gear, which may receive its drive from a motor mounted upon or adjacent the tank, the chocolate is elevated or fed vertically from the tank.

The uptake pipe is provided with a pair of outlets 14, 15, one 14 upon a level suitable for supplying a river or supply of chocolate for the immersion process of coating, and the other 15 for the production of a curtain or plurality of curtains. The outlet for the river-flow is preferably in the form of an aperture surrounded by a sleeve or collar 16, Fig. 2, upon or within which a cylindrical or other horizontal conduit 17 having a delivery aperture 23 is detachably mounted, preferably by sliding the conduit into the sleeve or collar upon the intake pipe. The cylindrical conduit 17 is coextensive with the transverse width of the usual wire conveyor 18 (see Fig. 2) for the discharge of the chocolate appropriately to constitute a river flow upon or adjacent to the fine gauze or other apron 19 (Fig. 6) which lies below the wire conveyor. The conduit 17 is supported in a bearing member 20 carried by the framing 21 of the machine so that it may slide or be partially rotated therein.

The cylindrical conduit 17 (Figs. 2 and 3) is provided with a slotted coaxial inner sleeve 22, the arrangement being such that the sleeve and the conduit may be relatively revoluble or movable to adjust or control or shut off the river-flow of chocolate, after the manner of a sleeve valve.

The slot or port 24 in the inner sleeve lies in a plane parallel with the axis of the conduit and one edge 24a thereof is curved or arranged in a form slightly helical, with a view to establishing a uniform flow, taking into account the fall in pressure which may exist along the conduit.

For the purpose of adjusting the flow from this conduit 17 a handwheel 26 is provided which is keyed upon a sleeve 27, the inner end of which is fixed to a disc 28 riveted or otherwise fastened to the conduit. The boss of the handwheel is provided with lugs 29 adapted to engage stops carried by the framing 21 so as to limit the rotational movement of the conduit in one direction and so prevent the wall of the aperture 23 contacting with the apron 19. The framing is provided with slots 30 to accommodate the lugs 29 when it is desired to move the conduit axially and release it from the collar 16.

Coaxial with the sleeve 27 is a spindle 31 the inner end of which is keyed to a spider 32 mounted in the inner sleeve 22 while the outer end is provided with a handle 33 by which rotational movement of the sleeve is effected.

By rotating the sleeve 22 the flow of chocolate from the aperture 23 may be controlled or cut off, or the aperture 24 in the sleeve 22 may be brought into register with an emptying port 34 in the conduit whereby the latter may be emptied.

For the production of the curtain the uptake 25 is adapted to discharge through the outlet 15 into a box or delivery pipe 35, Figs. 4 and 5, arranged parallel with and above the riverflow conduit 17 already described. This box is adapted to deliver the chocolate laterally to a channel or trough 36 provided with means for the production of a curtain or curtains of chocolate for coating or enrobing in known manner. A wall or baffle 37 is provided to insure a flow of chocolate to the end of the box. The box or conduit 35 may be provided with a valve or gate 38 adjacent the uptake pipe so that the supply thereto may be cut off or regulated as desired.

According to the present application of the invention the trough 36 will be described with reference to the production of a pair of curtains spaced longitudinally of the wire conveyor.

The preferred form of my curtain-producing means comprises a displaceable bottom portion for the trough 36 preferably in the form of a ridge member 39 having in cross section an inverted V shape. This ridge member is pivoted upon a shaft 40 having its axis transverse to the wire conveyor 18 and longitudinally of the trough 36 so that it may have an oscillatory vibrational movement, the design and arrangement being such that the marginal edges 39a of the ridge member have a movement more or less parallel to the direction of the fall of the curtain in order to avoid the creation of a ripple therein.

We have illustrated a device for producing two curtains of coating material, but do not limit ourselves to this structure. For example, if but one curtain were desired, the ridge member 39 would not be necessary, but an inclined or curved member pivoted along one edge might be employed.

The lower portions of the front and rear walls of the trough may be constituted by adjustable lips or members, that is to say, the walls of the trough may terminate short of the margins of the ridge member and may have pivoted strips or lips the angle of which may be varied with respect to the margins of the ridge member so that the slot or clearance between the margins of the ridge member and the lip may be altered to control the outflow of chocolate producing the curtains.

According to one convenient arrangement taken for purposes of illustration, the lower portions of the walls are formed by spring plates 41 having stiffening bars or strips 42 along their lower edges with which eccentrics 43 are adapted to contact. The eccentrics are carried by spindles 44 carrying slotted arms 45 whereby the eccentrics may be rotationally adjusted so as to adjust the position of the plates 41 with regard to the ridge member.

Thumb screws 46 are provided to lock the eccentric spindles 44 in position.

Although it is convenient to vibrate the ridge member with an oscillatory or pivotal motion the invention is not limited in this respect, and the ridge member or any other appropriate member may be vibrated vertically or in any way such that the portions thereof in direct control of a curtain move in a plane substantially parallel thereto so that the movements tend to break up or prevent the formation of stoppages in the aperture and consequent breaks in the curtain.

The drive for imparting movement to the vibrating member 39 is arranged so that it is automatically disconnected upon a rearward displacement of the trough 10 from the enrobing machine and similarly reconnected when the position of the trough is restored. For example, the drive may comprise tooth gears which may mesh or unmesh upon the said displacement, or as shown in Fig. 5, a ratchet drive mechanism may be employed in which the pawl freely comes away from its ratchet when the trough 10 is moved in the withdrawal of the chocolate supply appliances as is referred to hereinafter.

Referring to Figs. 4 and 5, the shaft 40 has rigidly mounted thereon a two armed member 47, 48, the arm 48 carrying a rod 48a in the end of which is adjustably mounted a pawl 49. The other arm 47 abuts against an adjustable screwed stop 50. The pawl 49 is adapted to engage a ratchet wheel 51 mounted upon a suitable part of the framing 21 and driven by any suitable means. It will be appreciated that on rotating the ratchet wheel the shaft 40 will be oscillated by the pawl 49 and the returning spring 52.

It will be understood from the above description that the appliances for producing the curtain and the river-flow, together with the tank and supply of chocolate, constitute a unit which may be withdrawn from or positioned in the machine bodily with the tank as it is slid or moved upon its wheels into or out of the machine, the only manipulation necessary for the removal or replacement operation being the removal or re-positioning of the river-flow conduit 17 from the collar 16.

In certain cases where the tank 10 and associated parts may be withdrawn in a direction at right angles to that indicated in the form shown in Fig. 1, the river-flow conduit may also be permanently connected to the elevator conduit.

Further, in the form of apparatus shown in Fig. 1, the curtain coating means is adapted to pivot on the conduit 25. For this purpose a flange support element 35a is rigidly fixed on the conduit and forms a track for a roller 35b on the collar 35c. Vertical adjustment of the flange support 35a may be effected by the screw 35d.

When it is desired to employ the apparatus for the production of a curtain or a pair of curtains only, it is not necessary to shut off the river-flow conduit 17 as the conveyor will normally discharge all or the greater proportion of its cholocate to the upper conduit 35, due apparently to the high viscosity of the chocolate and the speed of the elevating screw. With the river-flow conduit open some of the partly cooled excess chocolate finds its way back into the river-flow conduit and will mix with the chocolate being elevated to the curtain conduit 35, and it is a feature of the invention that the recirculation of the chocolate in this way aids in the production of a curtain having an improved consistency for coating.

Where it is desired to treat the goods to immersion only, the flow to the upper level or curtain conduit 35 will be shut off by the gate valve 38 so that the conveyor in the uptake 25 will discharge into the river conduit 17 to produce the required immersion flow upon the fine wire or other apron 19 employed below the wire conveyor 18.

A shutter or valve similar to the valve 38 may be employed in connection with the river flow conduit 17.

Where it is desired to employ both an immersion treatment and a curtain treatment, the valves for controlling the flow to the two conduits are to be correspondingly adjusted.

The wire conveyor 18, Fig. 6, employed for conveying the goods to be coated through the machine or apparatus is of known form and according to the invention this conveyor is adapted to pass over a frame or support 53 (Figs. 6 and 7) which may be formed from longitudinal slats. This frame or support 53 is mounted upon levers or other means so that it is capable of a movement or displacement parallel to itself with a view to altering the path of the goods from one horizontal plane to another or others. Normally this adjustment affords a means for raising the goods from immersion or contact with the chocolate at the termination of a process or during a stoppage of the machine, but in addition to this function the adjustment is adapted to afford a means for determining the depth of the immersion treatment with respect to the goods.

The rear ends 53a of the slats are curved or hook shaped so that they hook upon a cross bar 54 carried by levers 55 rigidly mounted on the shaft 56. The shaft 56 is linked to a shaft 57 carrying the operating lever 58.

The forward ends 53b of the slats lie upon a rod 59 carried by the arms 60 pivotally mounted upon a cross shaft 61. The arms 60 are curved downwardly and carry pins 62 adapted to be engaged by the levers 63 fast on the shaft 57.

According to a feature of this arrangement a stop mechanism is employed to limit the position of the lower level of movement of the frame. For example, the operating lever 58 may be provided with a short arm 64 which is adapted to abut against an adjustable stop or set screw 65.

Suitable ratchet, cam or other mechanism may be employed to impart periodic movement to the wire frame or support 53 so that during the treatment of the goods by the immersion method they are alternately raised or lowered upon the wire conveyor into and out of the river or stream of chocolate. Adjustment may be afforded for altering the periodicity of the dipping movement, and the adjustable stop 65 enables the depth of treatment to be varied as desired according to the requirements of the goods under treatment.

According to a further feature the means for moving the frame 53 may be interconnected with the belt striking mechanism of the machine, or other mechanism determining the starting and stopping thereof. In one form (not shown) the belt striking mechanism may have a leverage and linkage which imparts a raising movement to the frame as soon as the striking gear is operated to stop the machine. When this occurs the elevation of the frame causes the wire conveyor 18 to be raised and to lift the chocolates under treatment from their usual path and out of any chocolate in which they may be immersed or with which they may be in contact.

Supporting rollers or transverse elements for supporting the wire conveyor, instead of lying as is usual in a horizontal plane are positioned to avoid the distortion or the curling of the edges of the conveyor 18 as is apt to occur during wear and tear. The rollers or other supporting elements are positioned with their axes lying at spaced intervals in a plane curved longitudinally of the conveyor rim so that the conveyor is given a curvature about an axis transverse of the machine which will counteract any tendency for the margins of the conveyor to curl or distort. This curvature, to prevent distortion, need only be slight and such as does not interfere in any way with the normal travel of the conveyor and treatment of the chocolates. Preferably the displaceable frame 53 is similarly curved. As shown in Fig. 6, the wire conveyor 18 is supported by rollers and frame 53 in such a manner that a longitudinal curvature of the upper lap is formed (as will be appreciated by reference to the horizontal or datum line 66).

Having thus described our invention, what we claim and desire to secure by Letters Patent is:

1. In a confection-coating machine, a wire conveyor for carrying goods therethrough, an upright conduit communicating with a supply tank for coating material, an elevator in said upright conduit for raising coating material to said curtain-flow conduit, a substantially horizontal conduit communicating with said upright conduit for producing a curtain flow of coating material and positioned transversely of said wire conveyor, a valve located between said horizontal and upright conduits, a band beneath said wire conveyor for supporting a stream of coating material onto which the material from said curtain falls, and a second substantially horizontal conduit communicating with said upright conduit located at one end of said band, into and through which at least a part of the coating material can drain into the upright conduit to be mixed with fresh material and returned to said curtain-flow-producing conduit.

2. In a confection coating machine, a device for producing a curtain of descending coating material comprising a trough, a displaceable bottom member for the trough, journaled in the ends of the trough and having at least one edge spaced from the adjacent side wall of the trough, and means for oscillating said bottom member so that said edge moves relatively to the adjacent side wall of said trough substantially parallel with the direction of fall of the curtain whereby to avoid the creation of ripples in the said descending curtain.

3. In a river-flow producer comprising a cylindrical conduit having a longitudinal outlet adapted to produce an immersion bath of coating material upon a band or other surface adjacent said outlet, and an inlet at one end of said conduit for the admission of coating material, a valve for controlling said outlet comprising a rotatable cylindrical sleeve coaxial with said conduit having a longitudinal port, that edge of said port which is the lower when the port is in register with the outlet of the conduit forming a helix directed so that the end of said edge near the inlet to the conduit is the highest point of said edge, to produce a uniform flow along said outlet by compensating for the drop in pressure which exists along said conduit.

4. In a confection-coating machine a permeable conveyor for carrying goods through an immersion bath of coating material, a frame for said conveyor over which said conveyor travels, of suitable extent and vertically movable as a unit so as to raise or lower a section of the conveyor co-extensive with said immersion bath, and mechanism for raising and lowering said frame, said mechanism having an interconnection with the control mechanism of the machine, so that the frame and conveyor thereon are automatically raised clear of the immersion bath when the machine is stopped.

In testimony whereof we affix our signatures.

ROBERT SAVY.
LOUIS LEBERT.
MAX MARC GUGGENHEIM.